United States Patent [19]

Theurer et al.

[11] 4,399,881

[45] Aug. 23, 1983

[54] TRACK WORKING OR TRANSPORT VEHICLE

[75] Inventors: Josef Theurer; Klaus Riessberger, both of Vienna, Austria

[73] Assignee: Franz Plasser Bahnbaumaschinen Industriegesellschaft mbH, Vienna, Austria

[21] Appl. No.: 175,573

[22] Filed: Aug. 5, 1980

[30] Foreign Application Priority Data

Oct. 5, 1979 [AT] Austria ................................ 6536/79

[51] Int. Cl.$^3$ ...................... G01G 19/08; G01G 19/04; G01G 13/14

[52] U.S. Cl. .................................... 177/137; 177/163; 177/165

[58] Field of Search ........................ 177/137, 163, 165

[56] References Cited

U.S. PATENT DOCUMENTS

| | | | |
|---|---|---|---|
| 1,147,127 | 7/1915 | Troll | 177/137 X |
| 3,190,383 | 6/1965 | Fountain | 177/137 |
| 3,587,760 | 6/1971 | Puhringer et al. | 177/163 X |
| 4,133,111 | 9/1975 | Theurer et al. . | |

FOREIGN PATENT DOCUMENTS

| | | |
|---|---|---|
| 220183 | 8/1961 | Austria . |
| 310269 | 4/1929 | United Kingdom . |
| 422953 | 1/1935 | United Kingdom . |
| 1253938 | 11/1971 | United Kingdom . |
| 1411174 | 10/1975 | United Kingdom . |

*Primary Examiner*—George H. Miller, Jr.
*Attorney, Agent, or Firm*—Kurt Kelman

[57] ABSTRACT

A track working or transport vehicle comprises a frame and two undercarriages supporting the frame. Springs are mounted between the side frames of the undercarriages and the vehicle frame, the springs having a stroke whose length is proportional to variable loads distributed to a respective undercarriage wheel from the vehicle frame. A displacement pickup is connected to each group of springs and arranged to measure the stroke thereof, the pickup generating an electrical output signal proportional to the measured stroke. An arrangement for continuously monitoring and indicating the loads distributed to the respective wheels includes a summation circuit having a first input receiving the output signals from the pickups, a second input received fixed electrical signals proportional to the weight of non-yieldingly mounted parts of the undercarriages, and an output transmitting electrical output signals proportional to the wheel loads derived from the inputs. An indicator device receives each output signal from the summation circuit and correspondingly indicates the wheel loads.

8 Claims, 6 Drawing Figures

TRACK WORKING OR TRANSPORT VEHICLE

The present invention relates to a track working or transport vehicle which comprises a frame, two spaced apart undercarriages supporting the frame, each undercarriage having a side frame associated with one of the track rails, an axle supported on the side frames and a respective wheel mounted on the axle and running on the rail, and spring means mounted between the side frames of the undercarriages and the frame of the vehicle, each spring means having a stroke whose length corresponds directly to variable loads distributed to a respective wheel from the frame.

Such vehicles with unequal wheel loads which may be varied during operation, such as crane-supporting vehicles, vehicles used to lay track switches or straight track sections, vehicles used for conveying and transporting waste and vehicles used in track maintenance work and subjected to varying working forces tending to impart variable loads to the wheels, require special means to assure their standing stability, safety against derailment and maintenance of loading limits to take into account their static and dynamic conditions which deviate from standard vehicles.

U.S. Pat. No. 4,113,111, dated Sept. 12, 1978, discloses a track-bound vehicle of this type and comprising a wheel load equalizing system including hydraulic cylinders arranged between the axle ends of the undercarriages and the vehicle frame, the cylinders having two chambers and pressure equalization conduits connecting like ones of the cylinder chambers of the cylinders positioned along a respective side of the vehicle associated with each track rail. If desired, shut-off valves may be arranged in the conduits. This system has been successfully used on vehicles supporting rotary cranes and subjects the vehicle frame to a predetermined torsion which takes some load off the wheels which are subjected to the load moment and distributes this load to the wheels which have been relieved of the load moment. The distribution of the one-sided loads through the vehicle frame in the form of torsion forces produces a more favorable load distribution over all four wheels in all prevailing loading conditions and operating positions of the crane boom. This improves the static and dynamic properties of the vehicle and also enhances the possibilities of monitoring the critical load factors and the traveling safety of such vehicles, thus enabling the vehicles to meet the various safety regulations and special requirements of various railroads.

In the non-analogous art of measuring track parameters, Austrian Pat. No. 220,183 discloses a mobile carriage for measuring the twist of a track, in which the distortions of four springs supporting the carriage frame at the four wheels of the carriage are picked up by electrical measuring elements associated with the springs and the output signals of these measuring elements are fed to a bridge circuit which generates a proportional measuring value signal. In this carriage, there is no problem of standing stability of traveling safety.

Contrary to this, the problem this invention addresses is encountered in track working and transport vehicles of the first-described type and concerns simple and effective means for continuously controlling and monitoring the data critical for the stability and traveling safety of the vehicle and for keeping these critical data within predetermined safety limits. Furthermore, the invention seeks to enable the operator of the vehicle to identify immediately the cause and location of any critical operating or load conditions so that he may take remedial action to assure the stability of the vehicle. In addition, the operational safety of the vehicle should be assured without unduly limiting the operational and load capacity of the vehicle.

In a track working or transport vehicle of the first-described kind, the present invention accomplishes the above and other objects with a displacement pickup connected to each spring means and arranged to measure the stroke of the spring means connected thereto, the pickup generating an electrical output signal corresponding directly to the measured stroke, and an arrangement for continuously monitoring and indicating the loads distributed to the respective wheels. The arrangement includes a summation circuit having a first input receiving the output signals from the pickups, a second input receiving fixed electrical signals corresponding to the weight of non-yieldingly mounted parts of the undercarriages, and an output transmitting electrical output signals corresponding directly to the wheel loads derived from the inputs, and an indicator device receiving each output signal from the summation circuit and correspondingly indicating the wheel loads. The arrangement preferably also includes a warning device having an input receiving the output signal from the summation circuit and an output generating a warning signal when the indicated wheel loads have reached a predetermined value.

Such a spring stroke displacement pickup and circuit arrangement can be built with simple structural and electrical circuit means, even into existing track working or transport vehicles, and provide the operator with continuous information of the data critical for the stability of the vehicle as reflected in the wheel load distribution. This enables the operator continuously to control the indicated wheel loads when critical limits are signalled and the warning device makes it possible to use the electrical output signals corresponding to the prevailing wheel loads directly as control signals for the drives of the vehicle so that the maintenance of predetermined stability value limits is automatically assured.

The above and other objects, advantages and features of this invention will become more apparent in the following detailed description of certain now preferred embodiments thereof, taken in conjunction with the accompanying generally schematic drawing wherein FIG. 1 is a side elevational view of a first embodiment of a vehicle incorporating the invention;

Figure 1:
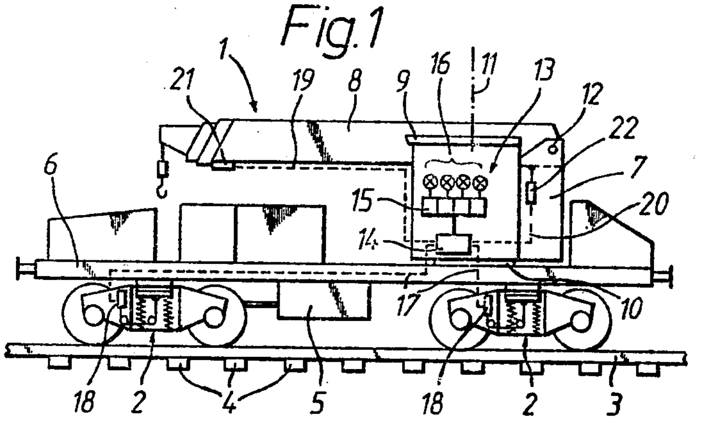

In the illustrated embodiments, the track working or transport vehicle comprises load-carrying means mounted on the vehicle frame and movable in relation thereto, movement of the load-carrying means causing the variable loads distributed to a respective wheel from the frame. In the embodiment of FIG. 1, the load-carrying means is a rotary crane.

As shown, two spaced apart undercarriages 2, 2 support frame 6 of vehicle 1. Each undercarriage has a respective side frame 23 (see FIG. 3) associated with a respective one of track rails 3, an axle 24 (see FIG. 2) supported on side frames 23 and a respective wheel mounted on the axle and running on the respective track rail. The track is constituted by rails 3 fastened to ties 4. The illustrated undercarriages are swivel trucks having two axles 24, 24. Vehicle 1 is self-propelled, drive 5 being mounted on the underside of frame 6 and transmitting power to the wheels of one of undercarriages 2. The rotary crane has a framework 7 supporting a telescopingly extensible and retractible boom 8 and turntable 10 supports the crane framework for rotation about vertical axis 11 on vehicle frame 6. Crane boom 8 is pivotal on framework 7 about horizontal transverse axis 12. Since they form no part of the present invention, the various drives for operating the crane have not been illustrated so as not to encumber the drawing.

Spring means constituted by a group of four coil springs 26 (see lower left corner of FIG. 2) are mounted between side frame 23 of undercarriages 2 and frame 6 of vehicle 1, each of the spring means having a stroke, i.e. a path of compression and extension, whose length corresponds directly to variable loads distributed to a respective one of the wheels from the frame.

Displacement pickup 18 is connected to each spring means and is arranged to measure the stroke of the spring means connected thereto, the pickup generating an electrical output signal corresponding directly to the measured stroke, as will be more fully explained hereinafter.

As shown in FIG. 1, operator's cab 9 on vehicle 1 is equipped with arrangement 13 for continuously monitoring and indicating the loads distributed to the respective wheels, the arrangement including electrical circuit 14, axle load indicator 15 and warning device 16 which has four warning lamps in the illustrated embodiment. Electric transmission lines 17 connect the four displacement pickups 18 to the inputs of circuit 14 to transmit the output signals of the pickups thereto, and electric transmission lines 19 and 20 connect two further displacement pickups 21 and 22 to further inputs of the circuit (for purposes to be described hereinafter).

Figure 2:
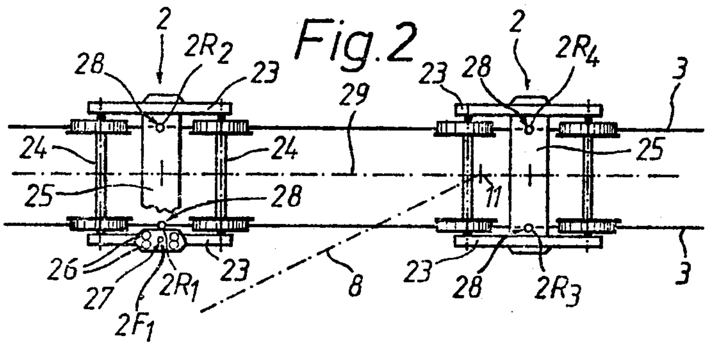
FIG. 2 is a diagrammatic plan view of the vehicle of FIG. 1.

FIG. 2 schematically shows only those details of undercarriages 2 and of the track, which are required for an understanding of the invention. Each illustrated swivel truck has two side frames 23, 23 which support two wheeled axles 24, 24, the group of coil springs 26 constituting the spring means being mounted intermediate the axles. Cradle or bolster 25 is similarly arranged intermediate the axles and supports vehicle frame 6, the bolster having respective ends associated with the side frames and spring means 26 being mounted between each bolster end and the associated side frame, respective ends of the springs means abutting the bolster ends and a lower beam of side frame 23. The resulting spring force yieldingly supporting frame 6 on the side frames of the swivel trucks extends in the direction of vertical center axis 27 around which the four coil springs are grouped. Assuming a rectilinear spring force, the length of the stroke of the spring means, i.e. the compression thereof, is directly proportional to the load distributed thereto by the bolster end from frame 6. Therefore, load portion 2F of the total vehicle weight distributed to a respective one of the swivel truck side frames may be derived from the stroke of the spring means on the respective side frame. Since the vehicle weight changes in accordance with the weight of the load carried by the rotary crane and the point of gravity of the vehicle moves in accordance with the movement of boom 8 about vertical axis 11 and/or horizontal axis 12, variable loads $2F_1$, $2F_2$, $2F_3$ and $2F_4$ are distributed to the four side frames. To obtain the actual loads carried by the wheels supported on each side frame from the indicated load portions, for example $2F_1$, the weight of non-yieldingly mounted parts of the undercarriages, that is, of the side frame, the wheel axles and any drive transmissions, must be added to load portion $2F_1$. Furthermore, since load portion $2F_1$ is calculated with respect to center axis 27 of the group of coil springs 26 while the wheel loads must be calculated with respect to the center axis 29 of the track, the total load value must be converted according to the proportion of the distances of center axis 27 and corresponding center point 28 between the two wheels on the adjacent rail (see FIG. 2) to center axis 29 of the track. Result $2R_1$ related to rail center point 28 corresponds to the loads distributed to the two wheels on side frame 23.

Figure 3:
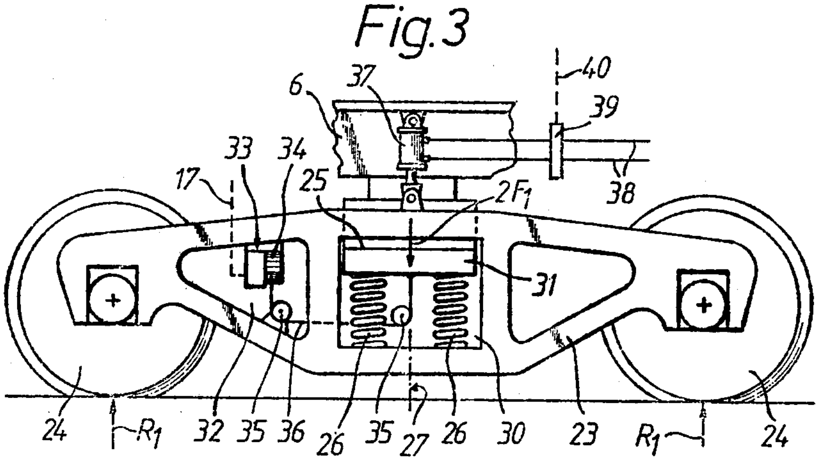
FIG. 3 is an enlarged side elevational view of an undercarriage of the vehicle of FIG. 1.

FIG. 3 shows a specific embodiment of a swivel truck combined with the present invention for obtaining load portion $2F_1$ of side frame 23 of the truck. As illustrated, the side frame defines rectangular central cut-out 30 and another cut-out 32 spaced from center bearing axis 27 of side frame 23. End 31 of bolster 25 is glidably guided in rectangular cut-out 30 and yieldingly supported by four coil springs 26 supported in the cut-out. The illustrated displacement pickup is a rotary potentiometer 33 affixed to the side frame in cut-out 32 and having pivotal control element 34 connected to associated bolster end 31 for movement therewith. The illustrated connection is constituted by cable line 36 having respective ends affixed to control element 34 and bolster end 31, the cable line being led by guide rollers 35 from the control element upwardly to the associated bolster end along center bearing axis 27 and centered between the four coil springs.

FIG. 3 also schematically indicates a wheel load equalizing system including double-acting hydraulic cylinder 37 associated with spring means 26, one end of the cylinder being linked to vehicle frame 6 while the piston rod of the hydraulic cylinder is linked to side frame 23. The cylinder has two chambers containing hydraulic fluid and pressure equalization conduits 38, 38 connect like ones of the cylinder chambers of the cylinders positioned along a respective side of the vehicle associated with each track rail, i.e. the upper cylinder chambers are interconnected and the lower cylinder chambers are interconnected. When the point of gravity of the vehicle is eccentric due to a movement of the load on the vehicle frame, hydraulic cylinder 37 will exert an additional force on side frame 23, which must be taken into account when wheel load R1 is calculated. For this purpose, pressure gage 39 is connected to a pressure equalization conduit 38 for generating an electrical output signal proportional directly to the measured pressure, which signal is fed into circuit 14 by transmission line 40.

The above-described swivel truck construction with its group of coil springs and the rotary potentiometer measuring the spring displacement is particularly simple and can be produced from readily available standard components producing output signals which may be readily fed to an electrical circuit. The illustrated cable line connecting the potentiometer to the bolster provides a structure largely protected from outside influences and damage while assuring a central sensing of the stroke of the spring means. This results in great accuracy in the results.

Figures 4, 5, 6:
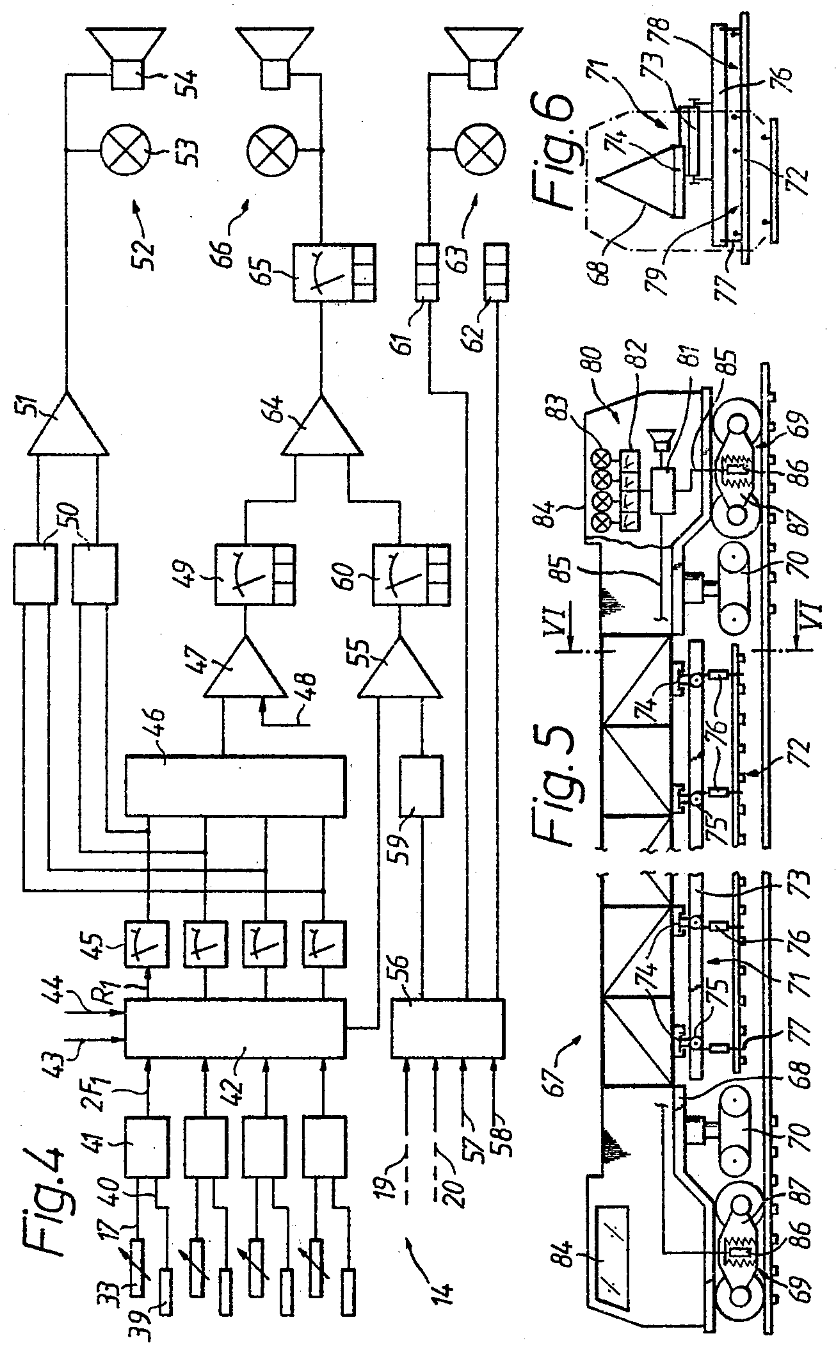
FIG. 4 is a schematic circuit diagram showing the monitoring and indicating arrangement of the present invention schematically.
FIG. 5 is a side elevational view of a second embodiment of a vehicle incorporating the invention.
FIG. 6 is a section along line VI—VI of FIG. 5.

FIG. 4 shows a schematic circuit diagram of arrangement 13 for continuously monitoring and indicating the loads distributed to the respective wheels of the vehicle. Illustrated circuit 14 of this arrangement includes respective differential element 41, which forms the input of the circuit, one differential element being associated with each side frame 23 of the two swivel trucks. Each differential element 41 has a first input receiving a respective one of the output signals of potentiometers 33 through transmission line 17, another input receiving a respective one of the output signals of pressure gages 39, and an output connected to a first input of summation circuit 42 and generating an output signal proportional directly to load portion $2F_1$, $2F_2$, $2F_3$, $2F_4$, respectively, distributed to the respective side frame, plus the additional force produced by pressure equalization obtained by cylinder 37 in the above-described manner. Obviously, differential element 41 is required only when the vehicle incorporates a pressure equalization system of the described type and more fully disclosed in the above-mentioned U.S. patent, in which case this added circuitry compensates for the torsions to which the pressure equalization system subjects the vehicle frame and takes them fully into account in calculating the wheel loads essential for the stability of the vehicle. This arrangement is simple enough to be readily built into existing vehicles with a pressure equalization system so as to take advantage of the monitoring arrangement of the invention.

In the absence of a pressure equalization system the first input of summation circuit 42 receives only the output signals from displacement pickups 33 through transmission lines 17. Second input 43 of the summation circuit receives fixed electrical signals corresponding to the weight of non-yieldingly mounted parts of the undercarriages, such as the side frames, a further second input 44 receiving a fixed electrical signal corresponding to the weight of the crane on the vehicle. As described hereinabove, the input signals are totalled in summation circuit 42 whose output transmits an electrical output signal directly proportional to wheel loads $R_1$, $R_2$, $R_3$, $R_4$ derived from the inputs. Indicator device 45 receives each output signal from summation circuit 42 and correspondingly indicates the wheel loads.

Preferred circuit 14 illustrated herein has a monitoring and indicating arrangement further including comparator circuit 46 for finding a respective minimum value of the wheel load. The comparator circuit has an input receiving the output signals proportional to the wheel loads from the summation circuit and is capable of selecting therefrom the signal characteristic of the minimum wheel load to generate at the output a signal characteristic of the respective minimum wheel load. This signal is transmitted to a first input of differential element 47 which has a second input 48 receiving a reference signal proportional to the wheel load when the vehicle runs empty. The two input signals are compared in differential element 47 whose output generates a signal indicating a standing stability for the vehicle which is characteristic of the extent of relief from the load on the least loaded wheel. This output signal is transmitted to indicator device 49.

This preferred circuit arrangement has the advantage that, instead of simultaneously controlling four wheel load indicators, an equally effective monitoring of the stability condition of the vehicle is obtained by the control of a single indicated value. This not only makes the work of the operator easier but also makes it possible to provide a simple input of desired limit values for the permissible extent of load relief into the circuit. Indicator device 49 continuously gives the extent of load relief of the respective wheel subjected to the least load and correspondingly the available load reserve. An individual indicator for each wheel load is preferred so that the operator may immediately determine which of the wheels approaches a maximum load relief as limit values indicating possible danger are reached.

Circuit 14 of the monitoring and indicating arrangement illustrated herein further includes a monitoring device consisting of a pair of circuits 50, 50 each connected to the summation circuit and having inputs receiving the output signals of two respective ones of potentiometers 33 respectively positioned at each side of center axis 29 of the track and an output generating a continuous control signal indicating a travelling safety value corresponding to the ratio between the loads $R_1$, $R_2$ and $R_3$, $R_4$ on the respective wheels associates with the potentiometers. This control signal characteristic of the traveling safety is produced in circuit 50 by comparing therein the ratio of the wheel loads with predetermined upper and lower limits for this value. When one of the control signals reaches the upper or lower limit, gate circuit 51 connected to the output of circuits 50 transmits the control signal to warning device 52 whose input receives the control signal and which generates at its output an optical or acoustic warning signal when the indicated traveling safety value has reached a predetermined value. This warning device may, for example, include a lamp 53 and/or a horn 54. As long as the control signals from circuits 50 remain within the predetermined limits, the vehicle may travel safely and no warning signal is generated, the load on all the wheels being such that the wheels properly engage the two rails and there is no danger of derailment.

The above-described circuitry assures not only standing stability for a vehicle subject to variable wheel loads but also provides traveling safety so as to avoid derailments, taking into full account changing superelevations along the track. If the ratio between the wheel loads on the left and right side of each undercarriage were not properly taken into consideration and kept within predetermined minimum and maximum values, the danger would arise that the less loaded wheel would be lifted off the rail, thus causing derailment. This is avoided by the above-described warning system.

If load-carrying means, such as a rotary crane or a track laying hoist, is mounted on the frame of the vehicle and movable in relation thereto, movement of the load-carrying means causing the variable loads on the wheels, and summation circuit 42 has third input 44 receiving electrical signals corresponding to the weight of the load carried by this means, it will be useful for the monitoring and indicating arrangement further to include another differential element 55 having a first input receiving the output signals from the summation circuit to provide a measuring parameter proportional to the load carried. This parameter is produced in summation circuit 42 by totalling wheel loads $R_1$, $R_2$, $R_3$ and $R_4$ and deducting from this sum the value of the proper weight of the vehicle itself. Another input of differential element 55 receives an electrical signal corresponding directly to a value indicating the maximum load the load-carrying means is capable of carrying in a respective operational position into which the load-carrying means has been moved in relation to the frame. In the illustrated embodiment, this electrical signal is the output signal of computing circuit 56 whose output is connected to the other input of differential element 55. The output signal of computing circuit 56 is derived from the following four input signals:

Transmission line 19 feeds a signal to a first input from displacement pickup 21 which signal is proportional to the length of the telescopingly extensible and retractible crane boom 8, indicating one parameter corresponding to the movement of the load-carrying means in relation to the vehicle frame. Transmission line 20 feeds a signal to a second input from displacement pickup 22 which signal is proportional to the pivoting movement angle of the crane boom about axis 12 in relation to the vehicle frame. Transmission lines 57 and 58 feed signals to third and fourth inputs of computing circuit 56 which signals are proportional to fixed geometrical values characteristic of the crane, such as the radius of the pulley, the eccentricity of horizontal pivoting axis 12 relative to vertical axis of rotation 11 and the like. The resultant signal indicating the maximum load the crane is capable of carrying in any operational position may be fed to indicator device 59 for indicating this value and is fed to the other input of differential element 55 where it is compared with the signal corresponding to the actual load carried to generate an output signal indicating the acceptable load. This signal may be fed to indicator device 60 for indicating the load value.

The above-described circuitry further enhances the operational safety of the vehicle since it also takes into account in the monitoring and indicating arrangement a control for the maximum load to which the load-carrying means may be subjected in each operational position. It makes use of the fact that the summation circuit generates output signals characteristic of the total wheel load and the permissible load on the load-carrying means may then be readily determined by deducting the weight of the vehicle proper and other determinative factors. Since the length and the pivotal angle of the boom may be readily measured, a continuous load control signal is readily available as a comparison value and this operational factor may be monitored by observing this single control signal.

It is particularly advantageous if this is combined with comparator circuit 46 delivers a control signal indicative of the standing stability of the vehicle so that the loading capability and the stability may be monitored at the same time.

In illustrating circuit 14, indicator instruments 61 and 62 are also connected to the output of computing circuit 56 to indicate the total height of the crane, i.e. the vertical distance of the free end of crane boom 8 from the track plane, and the prevailing operating radius of the crane boom. Warning device 63 is connected to indicating instrument 61 to signal an upper limit for the height of the crane so that there is no interference with any overhead transmission lines mounted over the track.

The preferred circuit illustrated herein is useful, as indicated hereinabove, for controlling the standing stability as well as the loading capability. For this purpose, gate circuit 64 is arranged to receive the output signals from differential elements 47 and 55 while transmitting only the larger one of the two signals. This, in turn, is transmitted to indicator device 65 connected to warning device 66. Indicator device 65 indicates continuously whether one of the control signals approaches a safety limit value or how far therefrom they may be. When the limit value is reached, a warning light will appear at warning device 66 or a horn will sound a warning signal.

FIGS. 5 and 6 illustrate the wheel load monitoring and indicating arrangement of the present invention applied to a different type of railroad vehicle, i.e. track switch laying vehicle 67. This vehicle is shown to comprise bridge-like frame 68 whose central part is constituted by a carrier framework and whose respective ends are supported on the track by two-axle swivel trucks 69. Furthermore, full-track undercarriages 70 are retractible mounted on frame 68 adjacent the swivel trucks and inwardly thereof to enable vehicle 67 to be supported and move on the ballast in a track renewal region where a switch is to be laid. The vehicle is equipped with hoisting apparatus 71 for receiving, transporting and laying assembled track switch 72. This apparatus comprises elongated carrier 73 laterally movably mounted on frame 68 and capable of carrying the track switch. The elongated carrier is mounted on transverse horizontal guide tracks 74 affixed to the framework of the vehicle frame for lateral movement in relation thereto, as shown in FIG. 6. Elongated carrier 73 has a plurality of lifting units 75 on which transverse carrier 76 are vertically movably suspended. Each transverse carrier has gripping hooks 77 for subtending the rails of switch 72 so that the assembled switch may be hoisted.

FIG. 6 shows the operational position of apparatus 71 before track switch 72 has been laid. Because branch track line 78 is laterally displaced relative to main line 79 of the switch, elongated switch carrier 73 must be moved along transverse guide tracks 74 until the center axes of main track 79 and of the laid track coincide. This displaces the overall point of gravity of vehicle 67 loaded with switch 72 towards the side of branch line 78. Since furthermore the point of gravity of switch 72 itself is not in the center of the switch but is displaced towards the frog, the wheels of undercarriage 69 are subjected to uneven loads. Therefore, the vehicle is equipped with monitoring and indicating arrangement 80. As hereinabove described, this includes control circuit 81, wheel load indicator device 82 and warning device 83, the arrangement being arranged on the control panel of at least one of the two operator's cabs 84.

Functionally equivalently to the circuit described in detail hereinabove, transmission lines 85 connect displacement pickups 86 connected to the springs means on side frames 87 of the four swivel trucks 69 to the input of circuit 81. In this embodiment, displacement pickups 86 are mounted centrally in relation to the group of four coil springs, instead of being mounted laterally spaced, as in the embodiment of FIG. 3.

Circuit 81 is somewhat simpler than circuit 14 illustrated in FIG. 4 and described hereinabove, and differs therefrom in the following respects:

Since vehicle 67 does not have a wheel load equalizing system, there is no need for differential element 41 and the output signals of displacement pickups 86 are transmitted by lines 85 directly to summation circuit 42. Also, computing circuit 56 and circuit elements 59 to 63 generating a maximum load control signal may be omitted or so modified that a safety control signal characteristic of the permissible lateral displacement of elongated carrier 73 may be obtained.

The monitoring and indicating arrangement of the invention enables the operator to have continuous control signals at his disposal which give him all the critical values he requires for a safe operation of the vehicle. Depending on the readings on the various indicators giving the operator the respective values, proper corrective measures may be taken to establish the desired equilibrium. Since a central control panel in the operator's cabin may hold all the indicating and warning instruments, the operator will be readily able to control all critical operational factors.

While the invention has been described in connection with certain now preferred embodiments, it will be readily understood by those skilled in the art that it is limited neither to the specific types of vehicles nor the circuitry described and illustrated by way of example. This invention is useful in various kinds of track maintenance and other railroad vehicles whose operations entail variable wheel loads. It may be used, for instance, on tampers designed to tamp ballast under a plurality of ties simultaneously and where the wheels of the undercarriage adjacent the tamping unit may tend to be lifted off the track due to the reaction forces encountered by the immersing tamping tools, particularly when the ballast is heavily encrusted. Wherever operations may cause changes in the wheel loads and thus endanger the stability of the vehicle, the monitoring and indicating arrangement of the present invention will be very useful.

What is claimed is:

1. A track working or transport vehicle comprising
(a) a frame,
(b) two spaced apart undercarriages supporting the frame, each one of the undercarriages having a respective side frame associated with a respective one of the track rails, an axle supported on the side frames and a respective wheel mounted on the axle and running on the respective track rail,
(c) spring means mounted between the side frames of the undercarriages and the frame of the vehicle, each of the spring means having a stroke whose length corresponds directly to variable loads distributed to a respective one of the wheels from the frame,
(d) a displacement pickup connected to each one of the spring means and arranged to measure the stroke of the spring means connected thereto, the pickup generating an electrical output signal corresponding directly to the measured stroke, and
(e) an arrangement for continuously monitoring and indicating the loads distributed to the respective wheels, the arrangement including
(1) a summation circuit having a first input receiving the output signals from the pickups, a second input receiving fixed electric signals corresponding to the weight of non-yieldingly mounted parts of the undercarriages, and an output transmitting electrical output signals corresponding directly to the wheel loads derived from the inputs, and
(2) an indicator device receiving each output signal from the summation circuit and correspondingly indicating the wheel loads.

2. The track working or transport vehicle of claim 1, wherein the undercarriages are swivel trucks each having two axles and the spring means is constituted by a group of coil springs mounted intermediate the axles.

3. The track working or transport vehicle of claim 1 or 2, wherein the monitoring and indicating arrangement further includes a warning device having an input receiving the output signal from the summation circuit and an output generating a warning signal when the indicated wheel loads have reached a predetermined value.

4. The track working or transportation vehicle of claim 1 or 2, wherein the monitoring and indicating arrangement further includes a comparator circuit having an input receiving the output signals from the summation circuit and capable of selecting therefrom the signal characteristic of the minimum wheel load, and an output generating a signal characteristic of the selected minimum wheel load, and a differential element having a first input receiving the characteristic signal from the comparator circuit, a second input receiving a reference signal proportional to the wheel load when the vehicle runs empty, and an output generating a comparison signal indicating a standing stability for the vehicle which is characteristic of the extent of relief from the load on the least loaded wheel.

5. The track working or transort vehicle of claim 1 or 2, wherein the monitoring and indicating arrangement further includes a monitoring device connected to the summation circuit and having inputs receiving the output signals of two respective ones of the displacement pickups respectively positioned at each side of the center axis of the track and an output generating a continuous control signal indicating a traveling safety value corresponding to the ratio between the loads on the respective wheels associated with the pickups, and a warning device having an input receiving the control signal and an output generating a warning signal when the indicated traveling safety value has reached a predetermined value.

6. The track working or transport vehicle of claim 1 or 2, further comprising a wheel load equalizing system including a cylinder associated with each one of the spring means, each one of the cylinders having two chambers containing hydraulic fluid, pressure equalization conduits connecting like ones of the cylinder chambers of the cylinders positioned along a respective side of the vehicle associated with each track rail, and a pressure gage arranged to measure the hydraulic fluid pressure in the conduits and generating an electrical output signal corresponding directly to the measured pressure, and wherein the monitoring and indicating arrangement further includes a respective differential element having a first input receiving a respective one of the output signals of the pickups, another input receiving a respective one of the output signals of the pressure gages, and an output connected to the first input of the summation circuit.

7. The vehicle of claim 1, wherein the undercarriages are swivel trucks each having two axles, each swivel truck includes a bolster arranged intermediate the axles and supporting the frame, the bolster having respective ends associated with the side frames, the spring means is constituted by a group of coil springs mounted between each bolster end and the associated side frame, and the displacement pickup is constituted by a rotary potentiometer affixed to each one of the side frames and having a pivotal control element connected to the associated bolster end for movement therewith.

8. The vehicle of claim 7, wherein each of the swivel truck side frames has a center bearing axis, four of said coil springs grouped around the axis constitute said spring means, the side frame defines a cut-out spaced from the center bearing axis, and the rotary potentiometer is affixed to the side frame in the cut-out, and further comprising a cable line connecting the pivotal control element to the associated bolster end, and a guide roller leading the cable line from the control element upwardly to the associated bolster end along the center bearing axis and centered between the coil springs.

* * * * *